(12) United States Patent
Galvan

(10) Patent No.: US 7,654,205 B2
(45) Date of Patent: *Feb. 2, 2010

(54) RAILCAR DOOR CONTROL APPARATUS

(75) Inventor: Guadalupe L. Galvan, DeKalb, IL (US)

(73) Assignee: Miner Enterprises, Inc., Geneva, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/313,402

(22) Filed: Nov. 20, 2008

(65) Prior Publication Data

US 2009/0078151 A1    Mar. 26, 2009

Related U.S. Application Data

(63) Continuation of application No. 11/409,698, filed on Apr. 24, 2006, now Pat. No. 7,493,865.

(51) Int. Cl.
*B61D 3/00* (2006.01)

(52) U.S. Cl. .................. 105/280; 105/286; 105/289

(58) Field of Classification Search .......... 105/280, 105/286, 289
See application file for complete search history.

(56) References Cited

U.S. PATENT DOCUMENTS

| 1,062,384 | A | * | 5/1913 | Campbell | 105/249 |
| 2,493,468 | A | * | 1/1950 | Swann | 105/280 |
| 3,104,623 | A | * | 9/1963 | Dorey | 105/248 |
| 3,256,836 | A | * | 6/1966 | Floehr | 105/248 |
| 3,434,433 | A | * | 3/1969 | Floehr | 105/249 |
| 3,440,761 | A | * | 4/1969 | Floehr | 105/290 |
| 3,469,539 | A | * | 9/1969 | Damy | 105/249 |
| 3,611,947 | A | * | 10/1971 | Nagy | 105/253 |
| 3,654,873 | A | * | 4/1972 | Floehr | 105/248 |
| 4,163,424 | A | * | 8/1979 | Lindauer | 105/313 |
| 4,184,432 | A | * | 1/1980 | Adler | 105/248 |
| 4,601,244 | A | * | 7/1986 | Fischer | 105/240 |
| 4,741,274 | A | * | 5/1988 | Ferris et al. | 105/240 |
| 4,829,908 | A | * | 5/1989 | Hallam | 105/240 |
| 5,063,858 | A | * | 11/1991 | Dugge | 105/253 |
| 5,601,032 | A | * | 2/1997 | Kosch | 105/304 |
| 6,019,049 | A | * | 2/2000 | Gaydos et al. | 105/289 |

(Continued)

*Primary Examiner*—S. Joseph Morano
*Assistant Examiner*—Jason C Smith
(74) *Attorney, Agent, or Firm*—Law Office of John W. Harbst

(57) ABSTRACT

An apparatus for controlling discharge of commodity from a railcar having a hopper with at least two transversely spaced discharge openings and two laterally spaced and commonly joined pivotal doors arranged in registry with the two discharge openings. The control apparatus includes a transversely extending operating shaft and a linkage system operably connecting the operating shaft to the doors. A drive mechanism is operably connectable to the linkage system. The drive mechanism includes a powered driver for selectively operating the linkage mechanism to either simultaneously move the doors into their closed position or to simultaneously move the doors from their closed position. The powered driver of the drive mechanism is operably connected to a lever radially extending from the operating shaft. To releasably hold and maintain the doors in their closed position, a lock assembly is arranged in operable combination with the driver. The lock assembly can be operated in response to powered or manual movement of the doors. An indicator is also provided for providing a visual indication, from a side of the car, the operable condition of the lock assembly.

29 Claims, 7 Drawing Sheets

U.S. PATENT DOCUMENTS 6,279,487 B1 * 8/2001 Gaydos et al. .............. 105/289
6,604,469 B1 * 8/2003 Galvan et al. ............... 105/289
7,493,865 B2 * 2/2009 Galvan ....................... 105/280
2007/0245923 A1 * 10/2007 Galvan ....................... 105/280
2009/0078151 A1 * 3/2009 Galvan ..................... 105/311.1

* cited by examiner

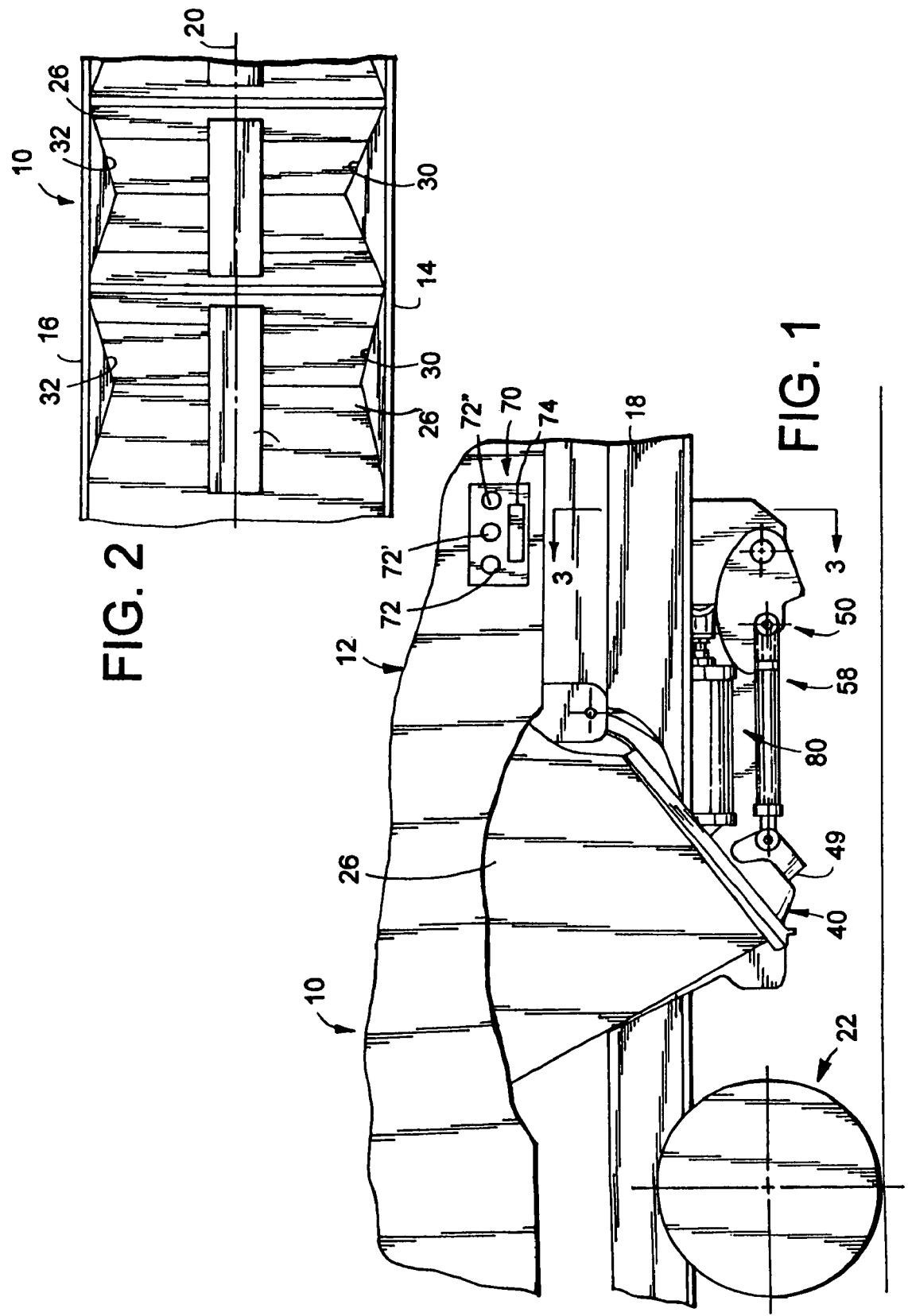

RAILCAR DOOR CONTROL APPARATUS

RELATED APPLICATION

This patent application is a continuation of coassigned U.S. patent application Ser. No. 11/409,698 filed Apr. 24, 2006, now U.S. Pat. No. 7,493,865.

FIELD OF THE INVENTION

The present invention disclosure generally relates to railroad hopper cars and, more specifically to an apparatus for controlling discharge of commodity from a railroad hopper car through openings arranged on opposed sides of a longitudinal axis of the railcar.

BACKGROUND OF THE INVENTION

A common type of railroad freight car in use today is an open top hopper car wherein the commodity carried by the railcar is discharged through openings provided on an underside of the car. Such railcars are used to haul aggregate, iron ore, coal and other commodities. Such railcars offer an advantageously economical method of transporting large amounts of such commodity between distantly spaced locations.

Such railcars typically include a walled enclosure or hopper carried by an underframe of the railcar. On some railcars, the underframe includes a longitudinally elongated centersill or support which is mounted, toward opposite ends thereof, by conventional wheeled trucks which ride on tracks or rails. Although the design of railcar hopper varies considerably between manufacturers, the railcar hopper is typically provided with a plurality of longitudinally spaced chutes. Each chute has discharge openings through which commodity is exhausted from the car. The discharge openings on a hopper type railcar extend either parallel to the longitudinal axis of the railcar (longitudinal openings) or are disposed in generally aligned pairs on opposite lateral sides of the longitudinal axis of the railcar (transverse openings). Each type hopper serves a particular need in the railcar industry.

To control the discharge of commodity from the railcar hopper, a door is arranged in operable combination and preferably in registry with each discharge opening on the railcar hopper. Basically, each door is hinged along an upper edge such that, when released, the door gravitationally swings toward an open position assisted by the commodity gravitationally moving through the discharge opening.

As will be appreciated, different door operating mechanisms have been proposed to move the doors between their closed and open positions. Preferably, the door operating mechanism will also serve to positively maintain the doors in their closed position during transport of the railcar between distantly spaced locations. It is important to note, however, such door operating mechanisms are specifically designed to the particular application with which they find use. For example, a mechanism used to operate longitudinally mounted doors cannot, without substantial redesign, be used to operate transversely aligned doors. For this and other reasons, those mechanisms used to operate longitudinally mounted doors do not and are not readily useful with those hopper cars having transversely mounted doors.

Designing an apparatus for operating transversely mounted doors on a hopper car involves serious design challenges. Manually operated devices for releasably holding transversely aligned doors in a closed position are known in the art. One such device involves using hooks or catches in combination with each door. Such prior art designs, however, typically require a person on each side of the railcar to release the hook or catch whereby allowing the door to swing toward an open position. Because of the location of the doors relative to the railcar hopper, however, access to such hook or catch is limited. Moreover, having a person on each side of the railcar to release the locks or catches from operable engagement with the doors is costly and, thus, adverse to the railcar industry. It has also been proposed to join or couple the two doors on opposed sides of the car to each other. Such design, however, does not necessarily reduce the persons required to release the doors from their closed and locked positions.

Other manually operated designs for opening and closing transversely mounted doors on a railroad road hopper car are also known in the art. One such manually operated door operating design involves mounting an elongated operating shaft on the underframe of the railcar for rotation about a fixed axis and a linkage system for operably interconnecting the operating shaft with the two transversely aligned doors mounted on the hopper of the railcar. While having several advantageous characteristics, this prior art design requires manual operation from either side of the railcar. As mentioned with respect to the manually operated locks or catches discussed above, having a person on each side of the railcar to operate the door operating mechanism is costly and, thus, adverse to the railcar industry.

It would be advantageous, therefore, to design a power operated door operating mechanism including a lock for holding the doors in their closed position. If the power operated mechanism is operated before the lock is released, however, considerable damage to a driver for such mechanism, the linkage operably associated with such mechanism, and etc. can occur, thus, severely complicating the overall design of such a mechanism.

With any power operated door operating device there is considerable concern over what could happen if there is a loss of power, for any reason, to such door operated device. That is, and after the hopper car arrives at an unloading site, what happens if there is no source of power for operating a powered door operating mechanism? Additionally, and after the hopper car arrives at an unloading site, what happens if power to an otherwise powered door operated mechanism is temporarily lost? As will be appreciated by those skilled in the art, most hopper car unloading sites allow only a minimum of time for the railcar to be unloaded and moved through the unloading site. If, for whatever reason, the power operated mechanism fails to successfully operate the discharge doors, the fully loaded railroad hopper car simply must be returned to the original location. The adverse costs of having to return a fully loaded car because the power operated mechanism failed to open the discharge doors is apparent.

Unless the doors on the hopper are fully closed during the entire travel of the railcar between locations, there can be a considerable loss of commodity from the hopper. As will be appreciated by those skilled in the art, it is difficult—at best—to determine whether the discharge doors on the hopper are fully closed simply by viewing the doors from the side of the hopper car. Accordingly, a relatively large number of loaded railroad freight cars are inadvertently added to a train consist with the doors being either partially open or with a lock assembly not being fully engaged with the door assembly. As a result, some such cars irretrievably lose relatively large quantities of commodity as they are transported between distant locations.

Thus, there is a need and continuing desire for a power operated apparatus designed to operate a pair of transversely mounted discharge doors on a railroad hopper car and wherein the power operated apparatus includes a lock which is operated in timed sequence to movement of the doors and which permits manual operation, when required, to affect release of the lock and, thus, timely discharge of commodity from the railcar and which furthermore includes an apparatus for visually indicating, from at least one side of the railcar, the operable condition of the door assembly lock.

SUMMARY OF THE INVENTION

In view of the above, and in accordance with one aspect, there is provided an apparatus for controlling discharge of commodity from a railcar having a longitudinally elongated centersill and a hopper supported on the centersill. The hopper defines at least two discharge openings arranged in generally aligned relation relative to each other on opposite lateral sides of the centersill and through which commodity is discharged from the hopper. The railcar further includes two laterally spaced doors mounted on the hopper and which are joined by an elongated connector. Each door is mounted for pivotal movement between closed and open positions relative to one of the discharge openings defined by the hopper so as to control the discharge of commodity from the hopper.

According to one aspect, the control apparatus includes an operating shaft which is rotatable about a fixed axis and extends transverse to the centersill. A linkage system operably connects the operating shaft and the elongated connector such that the linkage system simultaneously moves the doors into their closed position in response to rotation of the operating shaft in a first direction and simultaneously moves the doors from their closed position in response to rotation of the shaft in a second direction, with the first and second directions being opposed to each other. The linkage system consists of two interconnected links including a first link connected toward one end to and movable with the operating shaft and a second link connected to the elongated connector.

According to this aspect, there is also provided a drive mechanism operably connectable to the linkage system. The drive mechanism includes a powered driver for selectively operating the linkage mechanism to either simultaneously move the doors into their closed position or to simultaneously move the doors from their closed position. The powered driver of the drive mechanism is operably connected to a lever radially extending from the operating shaft.

To releasably hold and maintain the doors in their closed position, a lock assembly is arranged in operable combination with the lever extending from the operating shaft. The lock assembly includes a displacable stop which, when the doors are in the closed position, positively engages with the lever to prevent rotation of the operating shaft and thereby prevent movement of the doors from their closed position. The stop is driven in timed relation to movement of the doors such that upon rotation of the operating shaft, either manually or under the influence of the powered driver, to move the doors from their closed position, the stop is released from engagement with the lever prior to movement of the doors from their closed position.

According to this aspect, the first and second links of the linkage system are positioned in an overcenter arrangement when the doors are in their closed position. The overcenter arrangement of the links serves as a lock to releasably hold the doors in their closed position and inhibits the doors from inadvertently moving from their closed position.

Preferably, the displacable stop of the lock assembly is resiliently biased into positive engagement with the lever of the drive mechanism. In one form, the driver of the drive mechanism includes a distendable motor which is positively driven in opposed linear directions.

A drive is provided between the stop and the driver of the drive mechanism for positively releasing the stop from engagement with the lever upon actuation of the driver and prior to movement of the doors from their closed position. In a preferred form, such drive includes a lost motion connection for permitting a predetermined range of movement of the driver prior to movement of the doors from their closed position. Preferably, a spring mechanism is provided for positively returning the lost motion connection to an initial position upon return of the driver from an extended position such that the stop is permitted to again positively engage the lever upon the return of the doors to their closed position.

According to another aspect, the apparatus for controlling discharge of commodity from the railcar includes an operating shaft mountable on the railcar for rotation about a fixed axis extending transverse to the centersill and a linkage system operably connectable to the operating shaft and the elongated connector. According to this aspect, the control apparatus further includes a mechanism operably connectable to the linkage system. The mechanism includes a driver for selectively operating the linkage mechanism to either: simultaneously move the doors into their closed position; or, simultaneously move the doors from their closed position. Such drive mechanism is operably connected to a lever radially extending from the operating shaft and movable with the operating shaft through a predetermined path of travel.

According to this aspect, a lock assembly is arranged in operable combination with the powered driver. The lock assembly includes a displacable stop which, when the doors are in the closed position, positively engages with the lever radially extending from the operating shaft to prevent movement of the doors from their closed position. The stop is positively moved in timed relation to pivotal movement of the doors such that upon actuation of the driver to pull the doors from their closed position, the stop is automatically removed from engagement with the lever prior to pivotal movement of the doors from their closed position whereby allowing each door to be moved to the open position.

Preferably, the linkage system consists of two interconnected links including a first link connected toward one end to and movable with the operating shaft and a second link operably connected to the elongated connector. To releasably hold the doors in their closed position while inhibiting the doors from inadvertently moving from their closed position, the first and second links of the linkage system are preferably in an overcenter arrangement when the doors are in their closed position, with such overcenter arrangement of the links serving as a lock.

In one form, the displaceable stop of the lock assembly is resiliently biased into positive engagement with the lever. Moreover, a drive is provided between the stop and the driver of the drive mechanism for positively displacing the stop from the predetermined path of travel of the lever upon actuation of the driver and prior to movement of the doors from their closed position. Such a drive preferably includes a lost motion connection for permitting a predetermined range of movement of the driver prior to movement of the doors from their closed position. In a preferred form, a spring mechanism positively returns the lost motion connection to an initial position upon return of the driver from an extended position such that the stop is permitted to again positively engage the lever upon the return of the doors to their closed position.

According to another aspect, the apparatus for controlling discharge of commodity from a the railcar includes an operating shaft mountable on the railcar for rotation about a fixed axis extending transverse to the centersill. At least one end of the operating shaft is accessible to a side of the hopper after the shaft is mounted on the railcar so as to permit manual rotation of the operating shaft about the fixed axis. A linkage system has a first end thereof operably connectable to the operating shaft. Toward a second end, the linkage system is operably connectable to the elongated connector extending between the doors. A lever radially extends from and is movable with the operating shaft.

According to this aspect, a lock assembly is provided as part of the control apparatus and includes a displacable stop. The stop positively engages with the lever when the doors are in the closed position to prevent rotation of the operating shaft and, thus, prevent movement of the doors from their closed position. The lock assembly further includes a manually operated mechanism for removing the stop from engagement with the latch thereby allowing the doors to be moved from their closed position through manual rotation of the operating shaft. In one form, the manually operated mechanism for removing the stop from engagement with the lever is remote from the lock assembly. In a preferred form, the displaceable stop of the lock assembly is resiliently biased into positive engagement with the lever.

In accordance with this aspect, the control apparatus furthermore preferably includes a drive mechanism including a selectively operated driver operable between retracted and extended positions. The drive mechanism further includes a drive connection between the selectively operated driver and an end of the lever radially disposed from the fixed axis of rotation of the operating shaft for either: simultaneously moving the doors into their closed position; or, simultaneously moving the doors from their closed position.

In one form, the drive connection of the drive mechanism is further operably connected to the stop of the lock assembly. Preferably, the drive connection of the drive mechanism includes a lost motion mechanism which, when the driver is operated to simultaneously open the doors from their closed position, allows timely removal of the stop from the path of travel of the lever during collapse of the lost motion mechanism thereby allowing for unhindered travel of the latch prior to movement of the doors from their closed position. A spring mechanism is preferably included for positively returning the lost motion mechanism to an initial position upon return of the driver from an extended position such that the stop is permitted to again positively engage the free ended lever upon the return of the doors to their closed position.

The linkage system for the control apparatus preferably consists of two interconnected links including a first link, connected toward one end to and movable with the operating shaft, and a second link operably connected to the elongated connector. In a preferred form, the first and second links of the linkage system are positioned in an overcenter arrangement when the doors are in their closed position. The overcenter arrangement of the links serves as a lock to releasably hold the doors in their closed position while inhibiting the doors from inadvertently moving from their closed position.

According to another aspect, the apparatus for controlling discharge of commodity from a railcar includes an operating shaft mountable on the railcar for rotation about a fixed axis extending transverse to the railcar centersill and a linkage system operably disposed between the operating shaft and the elongated connector. A drive mechanism is operably connectable to the linkage system. The drive mechanism includes a driver for selectively operating the linkage mechanism to either: simultaneously move the doors into their closed position; or, simultaneously move the doors from their closed position. The driver of such drive mechanism is operably connected to a lever mounted on and radially extending from the operating shaft.

According to this aspect, the control apparatus further includes a lock assembly arranged in operable combination with the driver and operable in either of two conditions. The lock assembly includes a displacable stop which, when the doors are in their closed position, and in one condition, positively engages with the lever to prevent rotation of the operating shaft and thereby prevent movement of the doors from their closed position. In a second condition, the stop of the lock assembly is removed from engagement with the lever. That is, the lock assembly stop is driven in timed relation to movement of the doors such that, upon manual and powered rotation actuation of the operating shaft to move the doors from their closed position, the stop is removed from engagement with the lever prior to movement of the doors from their closed position. According to this aspect, the control apparatus further includes an apparatus for visually indicating the operable condition of the lock assembly.

BRIEF DESCRIPTION OF THE DRAWINGS

FIG. 1 is a side elevational view, with parts broken away, of a railroad hopper car embodying principals of the present invention disclosure;

FIG. 2 is a fragmentary top plan view of the railroad hopper car illustrated in FIG. 1;

DETAILED DESCRIPTION OF THE INVENTION DISCLOSURE

Figure 3:
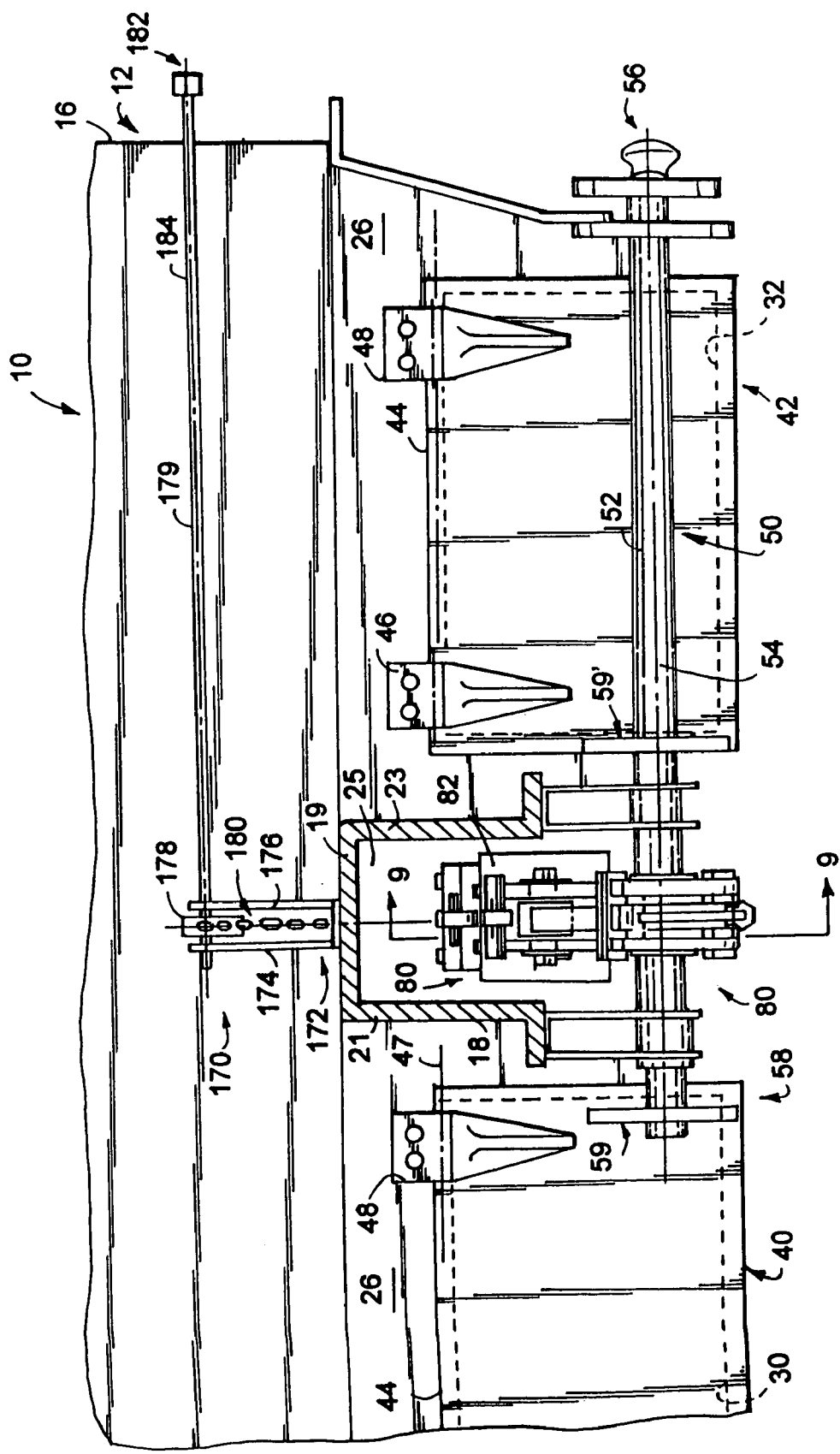
FIG. 3 is a fragmentary transverse sectional view taken along line 3-3 of FIG. 1.

While the present invention disclosure is susceptible of embodiment in multiple forms, there is shown in the drawings and will hereinafter be described a preferred embodiment of the invention disclosure, with the understanding the present disclosure sets forth an exemplification which is not intended to limit the invention disclosure to the specific embodiment illustrated and described.

Referring now to the drawings, wherein like reference numerals indicate like parts throughout the several views, there is shown in FIGS. 1 and 2, a railroad hopper car, generally identified by reference numeral 10. Although railroad hopper cars have a variety of configurations, they typically have a walled enclosure or hopper 12 for storing and transporting commodity therewithin. In the illustrated embodiment, hopper 12 has a pair of generally parallel sides 14 and 16 and opposed ends (not shown). In many configurations, hopper 12 has an open-top design, but the hopper could be closed, is so desired, with a conventional roof structure defining a central opening or trough and well known covers arranged to close such opening.

As shown in FIG. 1, hopper 12 is supported by an underframe including a centersill 18 extending longitudinally of the car and defining a longitudinal axis 20 (FIG. 2) for the car 10. Preferably, and as shown in FIG. 3, centersill 18 includes a top plate 19 with a pair of laterally spaced, generally parallel and depending arms 21 and 23 defining a recess or opening 25 therebetween. Underframe 18 is supported toward opposite ends by conventional wheeled trucks, generally identified in FIG. 1 by reference numeral 22. As known, each truck 22 includes at least one pair of laterally spaced wheels which ride on laterally spaced rails or tracks.

Hopper 12 can take a variety of configurations. Suffice it to say, in the exemplary embodiment, hopper 12 is provided with a plurality of longitudinally spaced funnel-shaped chutes 26 (with only one being shown in FIG. 1) between the opposed ends of the hopper 12. As shown in FIG. 2, each chute 26 defines a pair of openings 30 and 32 arranged in generally transverse alignment relative to each other on opposed sides of the longitudinal axis 20 and through which commodity is discharged from the hopper 12.

Turning to FIG. 3, a pair of transversely spaced and generally aligned doors 40 and 42 are arranged in registry with the discharge openings 30 and 32, respectively, of each chute 26 to control the discharge of commodity from hopper 12. As shown, each door 40, 42 is hinged toward an upper edge 44 thereof to hopper 12. In the illustrated embodiment, each door 40, 42 is connected to the hopper 12 by a pair of transversely spaced hinges 46, 48 which allow each door 40, 42 to pivot about a generally horizontal axis 47 (FIG. 4) extending generally normal to the longitudinal axis 20 (FIG. 2) of the car 10. In one form, a transversely elongated cross bar or connector 49 couples the doors 40, 42 to each other. As such, the doors 40, 42 simultaneously move between open and closed positions relative to each other.

In the illustrated embodiment, an apparatus 50 is provided in combination with each pair of doors 40, 42 on car 10 for selectively and independently controlling discharge of commodity from each hopper chute 26. Preferably, each control apparatus 50, operably associated with each pair of doors 40, 42, is substantially identical. Thus, only one control apparatus will be described in detail. Each control apparatus 50 preferably permits either manual operation or mechanically powered movement of the doors 40, 42 between closed and open positions.

Figure 4:
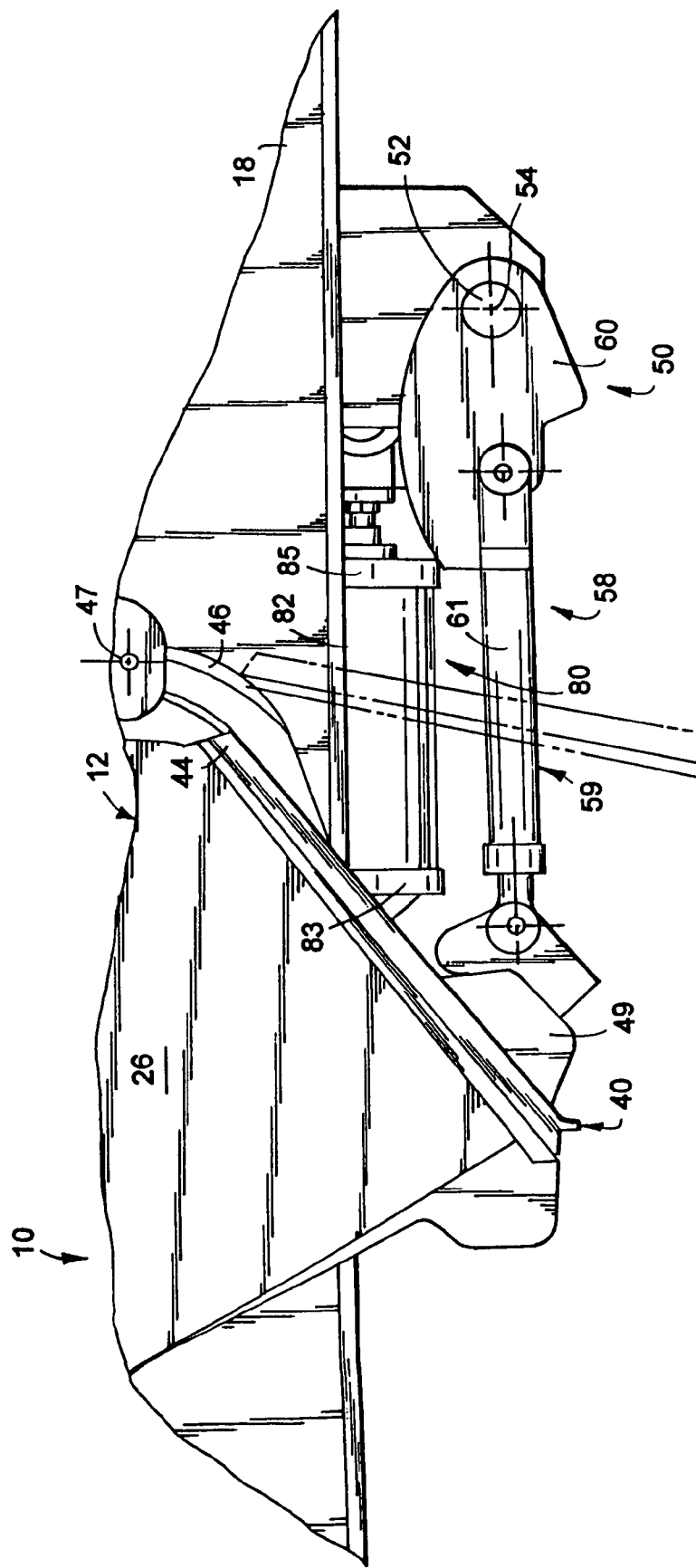
FIG. 4 is an enlarged fragmentary side view of a railroad hopper car embodying principals of the present invention disclosure.

In the embodiment illustrated in FIG. 4, control apparatus 50 includes an elongated operating shaft 52 mounted on the hopper 12 for rotation about a fixed and generally horizontal axis 54. To reduce the weight thereof, the elongated operating shaft 52 preferably has a hollow tubular configuration. As shown, shaft 52 extends transverse to the centersill or support 18. In the illustrated embodiment, the operating shaft 52 is of sufficient length such that at least one free end of the shaft 52 extends to a side 14/16 of the hopper 10 to allow for access thereto.

The operating shaft 52 is operably connected to the doors 40, 42 through a linkage system 58. In the embodiment shown in FIG. 3, linkage system 58 includes a pair of transversely spaced linkages 59 and 59'. Toward a first end each linkage 59, 59' is connected to the operating shaft 52. In the illustrated embodiment, and toward a second end, linkages 59, 59' are operably connected to the doors 40, 42, respectively. In the illustrated embodiment, linkages 59, 59' operate under compression as the doors 40, 42 move toward a closed position (FIGS. 1 and 4).

Preferably, linkages 59 and 59' are substantially identical to each other and, thus, only linkage 59 will be described in detail. In the embodiment shown in FIG. 4, each linkage includes multiple links 60 and 61 which are articulately interconnected to each other. Link 60 is preferably configured as a lever which radially extends away from the axis 54 and is nonrotatably secured or operably connected to rotate with operating shaft 52. As shown, link 61 is preferably configured as an elongated connector articulately joined toward one end to a location on lever 60 radially spaced from the axis 54 about which shaft 52 rotates. Link 61 is articulately connected toward an opposed end to the cross bar or connector 49 joining the doors 40, 42.

In the illustrated form, the links 60, 61 of each linkage 59, 59' and their connections to the respective doors 40, 42, to each other, and relative to axis 54 of shaft 52 are arranged in an overcenter linkage design serving as a primary lock for maintaining the doors 40, 42 in their closed position. That is, when the doors 40, 42 are closed, the connection between lever 60 and link 61 of each linkage 59, 59' assumes an overcenter position relative to the axis 54 of operating shaft 52 and the location whereat link 61 is joined to the connector 49 to positively maintain the doors 40, 42 in their closed position. In a preferred embodiment, the connection between lever 60 and link 61 is required to move overcenter when the doors 40, 42 are purposefully moved from their closed position to their open position.

Figure 5:
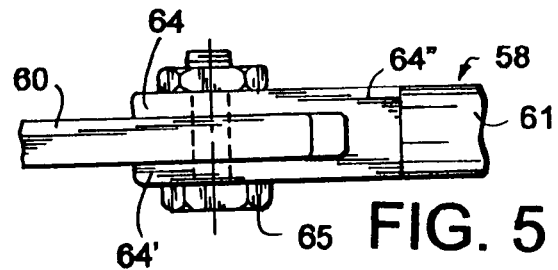
FIG. 5 is a top plan view taken along line 5-5 of FIG. 6

In the example shown in FIG. 5, the end of link 61 connected to lever 60 is preferably provided with a clevis-like configuration including a pair of parallel arms 64, 64' which embrace a portion of lever 60 therebetween and which are joined by a bight portion 64". A suitable connector 65, such as a conventional bolt or pin, passes endwise through the arms 64, 64' and through the lever or link 60 to operably and articulately interconnect lever 60 to link 61 at a distance radially spaced from the axis 54 of rotation of shaft 52.

In the illustrated embodiment, lever 60 has a peripheral edge, significant portions of which are identified as 66a through 66c. As the control apparatus 50 is operated to move the doors 40, 42 into their closed positions, the operating shaft 52 is rotated from the position shown in FIG. 7 and in a clockwise direction toward the position shown in FIG. 6 with lever 60 moving therewith in a clockwise direction. As will be appreciated from FIG. 6, rotation of shaft 52 in a clockwise direction continues until edge portion 66a of lever 60 engages portion 64" of the clevis-like configuration at the end of link 61. As such, further rotation of the lever 60 and, thus, shaft 52 is stopped or prevented by the abutting relationship between edge portion 66a of lever 60 against the clevis-like configuration at the end of link 61. Notably, edge portion 66a of lever 60 is preferably configured such that when abutment occurs between edge portion 66a and the clevis-like configuration at the end of link 61, the linkage system 58 and more particularly, links 60 and 61, have assumed an overcenter condition relative to each other and the doors 40, 42 are closed. Of course, each linkage 59, 59' preferably includes suitable and conventional cooperating instrumentalities allowing for adjustments of the operative length of each linkage 59, 59'.

Figure 7:
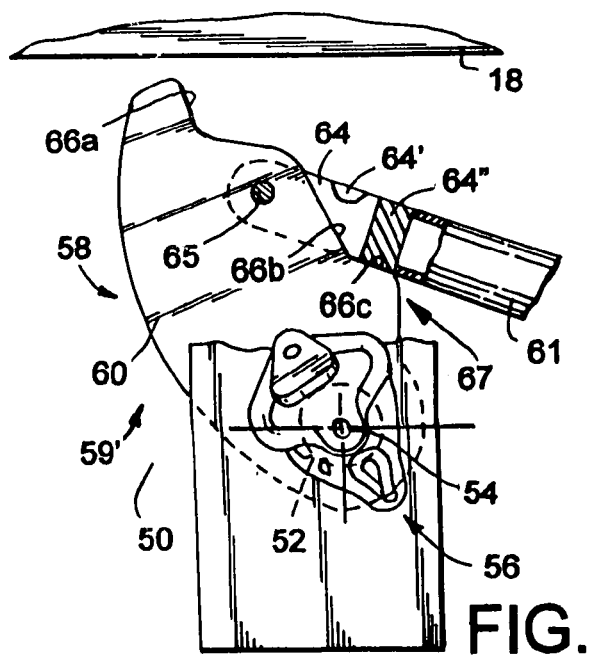

Preferably, linkage system 58 furthermore includes a stop 67 (FIG. 7) for limiting movement of the doors 40, 42 toward their open position. As apparatus 50 is operated to remove the doors 40, 42 from their closed position, shaft 52 is rotated, as shown in FIG. 7, in a counterclockwise direction with lever 60 moving therewith. As will be appreciated from FIG. 7, rotation of the operating shaft 52 in a counterclockwise direction can continue until edge portion 66c of lever 60 engages with bight portion 64" of the clevis-like configuration at the end of the link 61. As such, further counterclockwise rotation of lever 60 and, thus, operating shaft 52 is halted by the abutting relationship of edge portion 66c on lever 60 against the clevis-like configuration at the end of link 61. As shown, edge portion 66c is configured such that when abutment occurs between edge portion 66c on lever 60 and link 61, the doors 40, 42 are opened to allow the gravitational discharge of commodity from the hopper 12.

Figure 6:
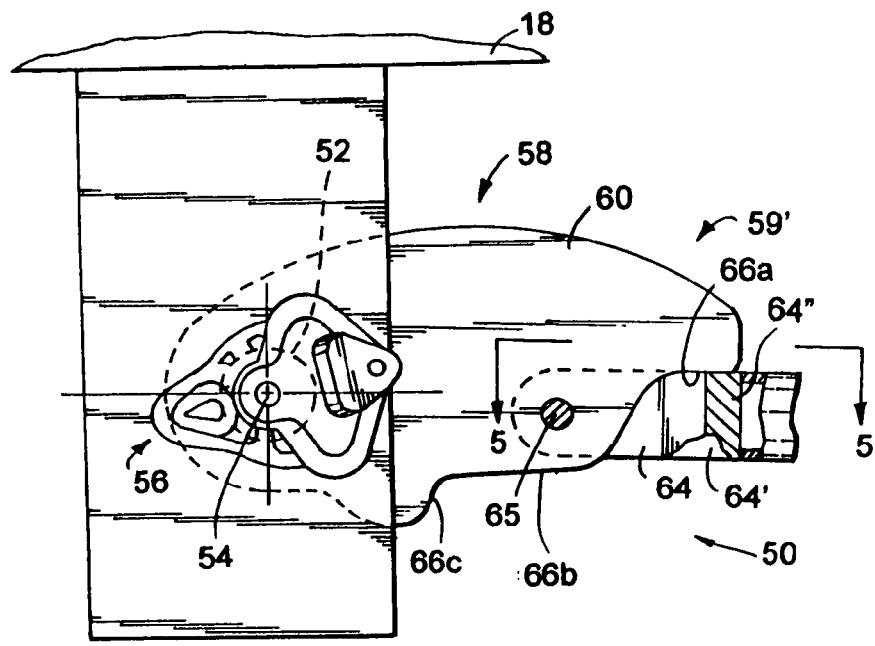
FIGS. 6 and 7 are enlarged fragmentary right side views of a portion of a control apparatus embodying principals of the present invention disclosure in different operating conditions.

As shown in FIGS. 4, 6 and 7, the end of the operating shaft 52, disposed proximate to the side 14/16 of the hopper 12, allows for manual rotation of operating shaft 52. The end of the operating shaft 52 disposed for manual rotation is preferably provided with an operating handle 56 configured to releasably accommodate a conventional opening bar (not shown) for rotating the operating shaft 52 and thereby allowing the doors 40, 42 to be manually opened. Of course, the specific design embodied at the end of the operating shaft 52 to facilitate manual rotation of shaft 52 can be other than that shown without detracting or departing from the spirit an scope of this invention disclosure. Suffice it to say, the handle 56 is nonrotatably secured to the shaft 52 and is disposed for ready accessability from the side 14, 16 of the hopper 12. In the illustrated embodiment, operating handle 56 rotates in a generally vertical plane extending normal to the axis 54 of shaft 52.

Figure 8:
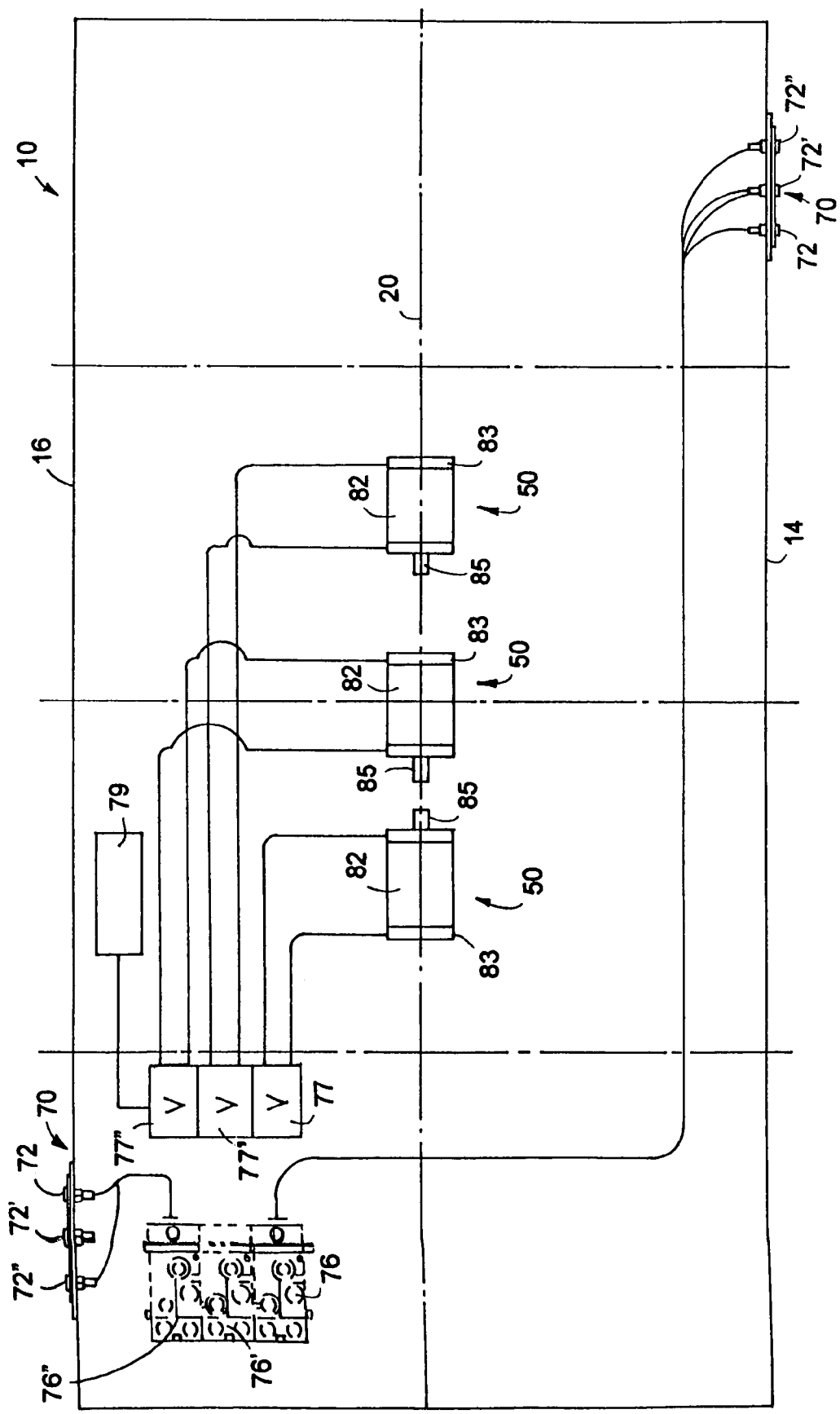
FIG. 8 is a schematic representation of one form of an electrical circuit which can be used in combination with the present invention disclosure.

Apparatus 50 is furthermore designed to permit powered movement of the doors 40, 42 between closed and open positions. As shown in FIGS. 1 and 8, an electrically operated touch pad assembly 70 is conveniently located on the car 10 to allow for selectively powered operation of each control apparatus 50 on the car 10. As shown in FIG. 1, touch pad assembly 70 includes three electrical contacts or buttons 72, 72' and 72" and an elongated electrical pad 74 for operating the individual control mechanisms 50 associated with the doors 40, 42 on each chute 26 of the hopper 12. Of course, if hopper 12 is provided with a greater or lesser number of chutes 26 than three, touch pad assembly 70 would be reconfigured accordingly. One form of an electrical circuit associated with the touch pad assembly 70 is schematically represented in FIG. 8. Selectively connecting any one of the contacts 72, 72' and 72" in combination with the pad 74 to an electrical supply source controls operation of solenoids 76, 76' and 76" carried on the car 10. As will be appreciated, each solenoid 76, 76' and 76" is operably associated with conventional valve structure including valves 77, 77' and 77", respectively, for directing power which, in the illustrated embodiment is air, from a suitable power source 79 to a selected control mechanism 50 to affect either powered opening or closing movements to the doors 40, 42 associated with a particular chute 26 on the hopper 12.

Figure 9:
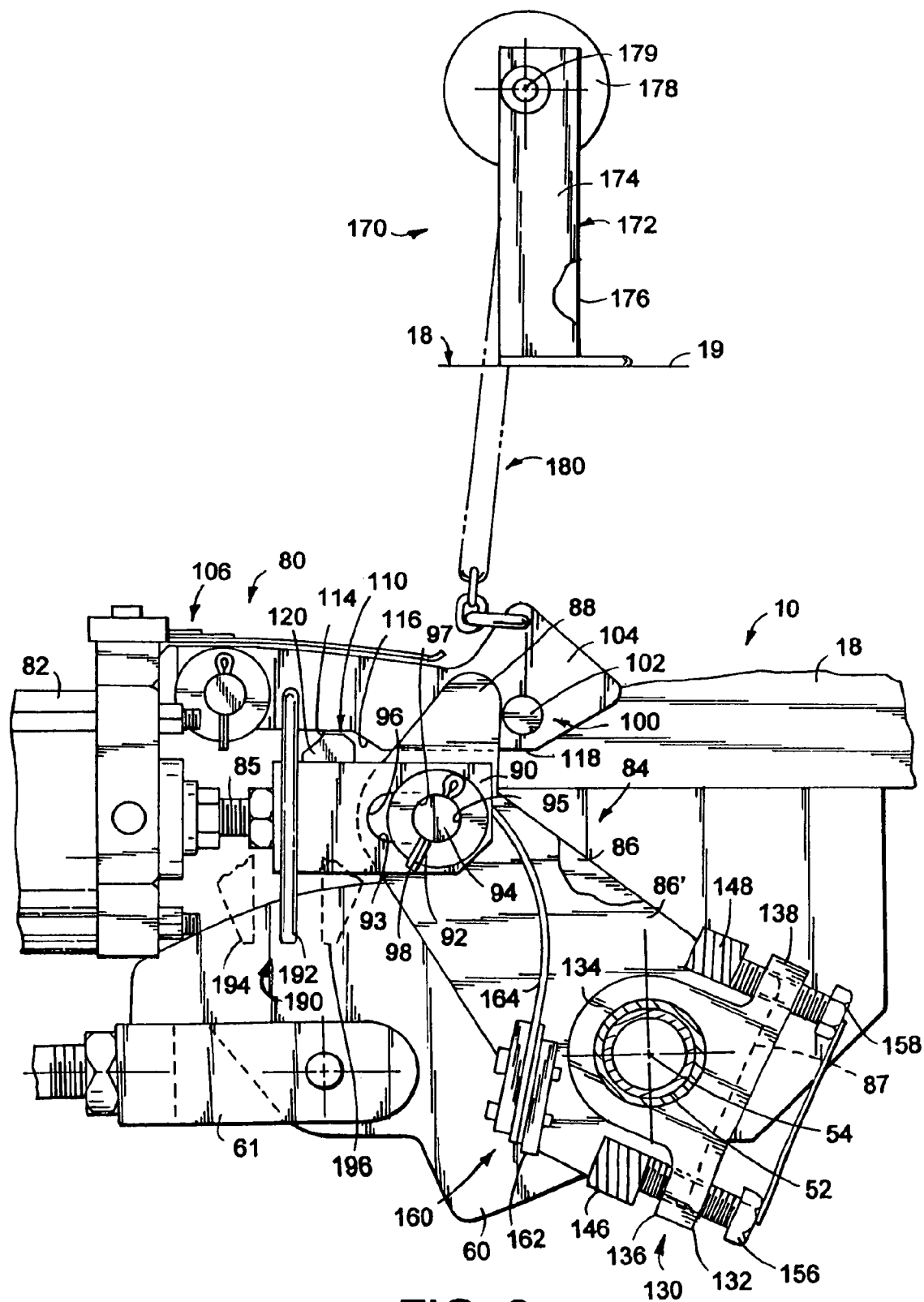
FIGS. 9 and 10 are enlarged and fragmentary side elevational views of the control apparatus of the present invention disclosure in different operational conditions.
Figure 10:
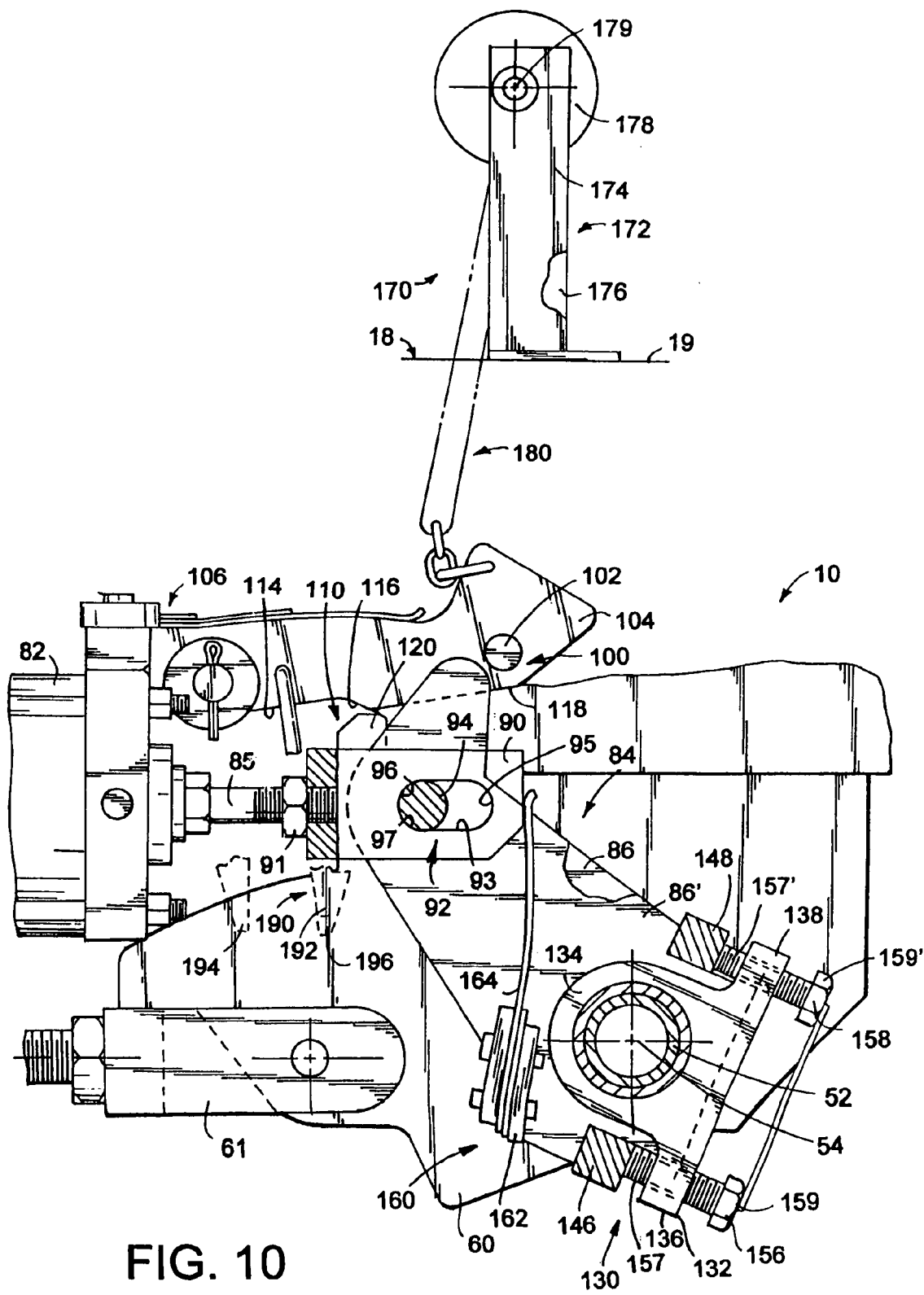

In the illustrated embodiment, each control apparatus 50 on the railcar 10 further includes a drive mechanism 80 operably connected to the linkage system 58 associated with a particular set of doors 40, 42. As shown in FIGS. 4, 9 and 10, the drive mechanism 80 of each control apparatus 50 includes a powered driver 82 for selectively operating the linkage system 58 to either simultaneously move the doors 40, 42 into their closed position or to simultaneously move the doors 40, 42 from their closed position toward an open position.

In a preferred form, the driver 82 for each control apparatus includes a linearly distendable motor, i.e., a pneumatically operated cylinder, having a fixed or mounted end 83 (FIG. 4) and a free or operative end 85. In the illustrated embodiment, and through operation of one of the solenoids 76, 76' or 76", air is selectively introduced toward either: the fixed end 83, to positively distend and operably lengthen the driver 82; or, the free or operative end 85 to cause the operative length of the driver 82 to positively retract, in length. In the embodiment shown in FIG. 3, driver 82 of each control apparatus 50 is vertically fitted, at least partially, within the recess 25 defined by the centersill 18 to optimize the vertical distance between a lower end of the control apparatus 50 and the ground over which the railcar 10 travels during transport.

As shown in FIGS. 9 and 10, a lever or latch assembly 84 radially extends from the operating shaft assembly 52 and is operably connected to the operative end 85 of driver 82. In one form, lever assembly 84 includes a pair of substantially identical and transversely spaced levers 86 and 86'. As shown in FIG. 9, a first end 87 of each lever 86, 86' is operably secured to and rotates with the operating shaft 52. A second or free end 88 of each lever 86, 86' follows a predetermined path of travel when the levers 86, 86' are rocked about axis 54 with shaft 52 in response to operation of driver 82.

As shown in FIGS. 9 and 10, a drive element 90 serves to operably interconnect the operative end 85 of driver 82 to the levers 86, 86' of lever assembly 84. As shown in FIG. 9, element 90 is secured to the operative end 85 of driver 82 in a manner permitting lengthwise adjustment of element 90 relative to the operative end 85 of the driver 82. After being adjustably secured thereto, element 90 is secured to the free end 85 of the driver 82 as through a suitable apparatus 91, which, in the illustrated embodiment, is a threaded jam nut.

Drive mechanism 80 further includes a lost motion connection 92 for permitting a predetermined range of movement of the driver 82 prior to movement of the doors 40, 42. As shown in FIG. 9, element 90 is provided with a longitudinally elongated slot or opening 93 allowing a transversely elongated drive pin 94 to pass endwise therethrough. The elongated slot or opening 94 defines a pair of longitudinally spaced limit stops 95 and 96.

In the illustrated embodiment, each lever or latch 86, 86' is provided, toward its free or second end 88, with an opening 97 for allowing the drive pin 94 to extend endwise therethrough. The opening 97 in each lever 86, 86' defines a closed margin which is proximately the same cross-sectional size as the drive pin 94 whereby inhibiting movement between levers 86, 86' and the drive pin 94 during operation of the drive assembly 80. As shown in FIG. 9, a suitable fastener 98 prevents the drive pin 94 from shifting endwise after being secured to the lever assembly 84.

In one form, each control apparatus 50 further includes a lock assembly 100 arranged in operable combination with the drive mechanism 80 for inhibiting the doors 40, 42 (FIG. 3) from inadvertently moving from a closed position toward an open position. Lock assembly 100 preferably includes a displacable stop 102. As shown in FIG. 9, when the doors 40, 42 (FIG. 3) are in a closed position, stop 102 preferably extends into the predetermined path of travel and positively engages with the lever or latch assembly 84 to prevent rotation of the operating shaft 52 and thereby prevents movement of the doors 40, 42 (FIG. 3) from their closed position.

In one form, the stop 102 of lock assembly 100 is moved or driven in timed relation to movement of the doors 40, 42 (FIG. 3). That is, upon actuation of the driver 82 to remove the doors 40, 42 from their closed position, the stop 102 of lock assembly 100 is moved or driven in timed relation to door movement such that the stop 102 is automatically removed from the predetermined path of travel of the lever or latch assembly 84 prior to movement of the doors from their closed position.

Preferably, the stop 102 is removed from the path of travel of the lever or latch assembly 64 in timed relation to movement of the doors 40, 42 as a result of the lost motion connection 92 forming part of the drive mechanism 80. That is, with the doors 40, 42 in their and locked and closed position, driver 82 of mechanism 80 assumes a position such as that illustrated in FIG. 9. As such, the drive pin 94 is linearly disposed toward one end of the elongated slot or opening 93 in the drive element 90. When driver 82 of mechanism 80 is selectively enabled to remove the doors 40, 42 from their closed position, the operative length of the driver 82 increases. As may be readily appreciated from comparing FIGS. 9 and 10, initial distention of the driver 82 from the position shown in FIG. 9 causes drive element 94 to freely shift along the length of the slot or opening 93 until the drive pin 94 engages limit stop 96 resulting in the collapse of the lost motion connection 92. That is, during the collapse of the lost motion connection 92, linear distention of the driver 92 has no rotational affect on the lever assembly 84 and, thus, the doors 40, 42 are not immediately moved from their closed position.

In the embodiment shown in FIGS. 9 and 10, stop 102 of lock assembly 100 is preferably carried on a lever 104 pivotally mounted toward the free end of driver 82. In a preferred embodiment, lever 104 is pivotally mounted between the free ends 88 of the latches or levers 86, 86' of assembly 84. Moreover, stop 102 transversely extends outwardly and away from opposite transverse sides of the lever 104 a distance sufficient to reside in and obstruct movement of the free ends 88 of levers 86, 86' of lever assembly 84 unless stop 102 is removed from the path of travel of the lever or latch assembly 84. As shown, lever 104 is preferably biased by a spring mechanism 106 thereby normally urging stop 102 into the predetermined path of travel of the lever assembly 84. Lock assembly 100 further includes structure 110 for positively removing the stop 102 from the path of travel of the lever assembly 84 and, thus, prior to the doors 40, 42 moving toward their open position by the drive mechanism 80.

As shown in FIGS. 9 and 10, structure 110 includes configuring an underside 112 of pivot lever 104 with a series of cam surfaces 114, 116 and 118. Moreover, an actuator 120 is carried on the drive element 90 of driver 82. In the illustrated embodiment, the surfaces 114, 116 and 118 on lever 104 are disposed different elevational distances from the path of actuator 120. When the doors 40, 42 are in their closed position, and as schematically illustrated in FIG. 9, surface 114 on lever 104 and actuator 120 are arranged in operable relation relative to each other.

As the drive element 90 linearly moves in response to actuation of driver 82 to open the doors 40, 42, actuator 120 is positively driven into operative engagement with cam surface 116 thereby causing lever 104 to pivot upwardly against the action of the spring mechanism 106 thereby forcibly displacing and removing stop 102 from the path of travel of the lever assembly 82. Continued liner displacement of drive element 90 under the influence of the driver 82 will cause the actuator 120 to move into contact with the cam surface 118 on lever 104 thus maintaining stop 102 in removed relation relative to the free end of lever assembly 84. With stop 102 now removed from the path of travel of the lever assembly 84, and with the lost motion mechanism 92 fully collapsed, continued linear displacement of the driver 82 will cause the lever assembly 84 along with the operating shaft 52 to rotate about axis 54 thereby causing the doors 40, 42 to be moved toward their open position.

Drive mechanism 80 also serves to positively close the opened doors 40, 42 through retraction of the driver 82. Upon retraction of driver 82, drive pin 94 traverses the length of the opening 93 in element 90 until pin 94 engages limit stop 95. After pin 94 engages with stop 95 further retraction of the driver 82 causes lever assembly 84 and shaft 52 to conjointly rotate about axis 54 thereby moving the doors 40, 42 into their closed position. When the doors 40, 42 are in a fully closed position, the actuator 120 is retracted to such an extent and relative to the cam surfaces 114, 116 and 118 on lever 104 so as to allow stop 102, under the influence of spring mechanism 106, to again assume a position lying in the path of travel of the lever assembly 84, thus, inhibiting rotation of the lever assembly 84 or the operating shaft 52 and thereby maintaining the doors 40, 42 in their closed position.

As will be appreciated from above, the spacial relationship between stop 102 and the free end 88 of the levers 86, 86' of assembly 84 is an important concern to proper operation of the lock assembly 100. To affect proper operation of the lock assembly 100 while accommodating tolerance variations and for other reasons, drive mechanism 80 is provided with an apparatus 130 allowing for adjustment between the free ends of the levers 86, 86' and the displacable stop 102.

In the illustrated embodiment, apparatus 130 includes an adjustment lever 132 which is rotatable about operating shaft 52 and relative to levers 86 and 86'. In the illustrated embodiment, adjustment lever 132 is transversely located between the first end 87 of levers 86 and 86' of assembly 84. As shown, adjustment lever 132 is provided with a midportion 134 which embraces and fits around shaft 52 along with spaced arms 136 and 138 extending in opposed planar directions from the midportion 134 of lever 132.

Apparatus 130 furthermore includes a pair of abutment members 146 and 148 transversely extending between and which are secured to the levers 86, 86' of lever assembly 84. Notably, member 146 is fixed to and between levers 86, 86' in spacial proximity to one side of the arm 136 of adjustment lever 132 and below the pivot axis 54 of operating shaft 52. Member 148 is fixed to and between levers 86, 86' in spacial proximity to one side of arm 138 of adjustment lever 132 and above the pivot axis 54 of operating shaft 52.

Apparatus 130 further includes threaded adjustment screws or bolts 156 and 158. Threaded adjustment screw or bolt 156 has a shank portion 157 carried by and in threaded engagement with arm 136 of adjustment lever 132 and a head portion 159 arranged to that side of arm 136 opposite from abutment member 146. Threaded adjustment screw or bolt 158 has a shank portion 157' carried by and in threaded engagement with arm 138 of adjustment lever 132 and a head portion 159' arranged to that side of arm 138 opposite from abutment member 148.

As will be appreciated from an understanding of apparatus 130, the free ends of the shank portions 157 and 157' of adjustment screws or bolts 156 and 158, respectively, abut with and against abutment members 146 and 148, respectively. The screws or bolts 156 and 158 are adjusted relative to each other so as to rotate and effectively position the free or second end 88 of the levers 86 and 86' of assembly 84 relative to the stop 102 of lock assembly 100. Once the proper relationship between the free or second ends 88 of the levers 86 and 86' of assembly 84 and the stop 102 of lock assembly 100 is established, the adjustment screws or bolts 156 and 158 of apparatus 130 are secured to prevent their independent rotation thereby maintaining the proper relationship between the second ends 88 of the levers 86 and 86' and the lock assembly stop 102.

As will be appreciated, manual rotation of the operating shaft 52 to open the doors 40, 42 will likewise cause linear distention of the driver 82 of drive mechanism 80. In this regard, and regardless of either powered or manual operation of the doors 40, 42 from an open position to a closed position, to ensure proper positioning of the stop 102 to inhibit inadvertent opening of the doors 40, 42 from a closed position, each control apparatus 60 is preferably operated under the influence of a spring mechanism 160.

As shown, spring mechanism 160 is preferably carried by and moves with the lever assembly 84. As shown in FIGS. 9 and 10, spring mechanism 160 includes a spring mounting carrier 162 transversely extending between and secured toward the lower end 87 of levers 86, 86' of lever assembly 84 beneath the path of the drive element 90 of drive mechanism 80. Extending from the spring mounting carrier 162 is a leaf spring 164. One end of the leaf spring 164 is secured to the mounting carrier 162. In the preferred form, an opposite, free end of the leaf spring 164 presses against and resiliently urges the drive element 90 endwise toward the motor 82 and, thus, positively returns the lost motion connection 92 to an initial condition or position. By pressing against drive element 90, spring mechanism 160 furthermore ensures actuator 120 will be returned to a position to allow cam surface 114 on lever 104 to again be positioned relative to the actuator 120, preferably under the influence of spring mechanism 106, whereby allowing the stop 102 to return to a proper position in the path of travel of the levers 86, 86' so as to prevent the doors 40, 42 from inadvertently moving from a closed toward an open position.

Because the free end of the leaf spring 164 presses against an end thereof, drive element 90 of each control apparatus 50 is preferably configured to reduce wear on the spring 164. In the illustrated form, the free end of the drive element 90 is chamfered or otherwise configured such that as the free end spring 164 slides endwise along the end surface thereof, as element 90 linearly moves in response to distention/retraction of motor 82, the free end of spring 164 will slide thereover with reduced or little wear and damage occurring thereto.

As shown in FIGS. 3, 9 and 10, lock assembly 100 furthermore preferably includes a manually operated mechanism 170 for manually removing the stop 102 from operable engagement with lever assembly 82 thereby allowing the doors 40, 42 to be moved from a closed position toward an open position through manual operation of the operating shaft 52 in an instance where power, for whatever reason, is lost to the railcar 10. In the illustrated embodiment, and to facilitate access thereto, the manually operated mechanism 170 is disposed remote from the displacable stop 102 of lock assembly 100.

In that embodiment illustrated in FIGS. 9 and 10, the manually operated mechanism 170 includes a mount 172 affixed to an upper surface of the top plate 19 of the centersill 18 longitudinally between adjacent chutes 26 on the car 10. In the form shown in FIG. 3, mount 172 includes two rigid upstanding and spaced arms 174 and 176. Returning to FIGS. 9 and 10, a rotatable carrier or wheel 178 is mounted between the free ends of the arms 174, 176 of mount 172 for rotation about an axis 179 extending generally parallel to axis 54 of operating shaft 52. One end of a chain, rope or other suitable force transfer mechanism 180 is secured for rotation with the wheel or carrier 178. An opposite end of the chain 180 is secured toward the free end of the lever 104 which carries the stop 102.

The manually operated mechanism 170 further includes an actuator 182 for imparting movement to the wheel or carrier 178. In that form shown in FIG. 3, actuator 182 is configured as an elongated operating rod 184 extending preferably coaxial with axis 179 from one side of the carrier or wheel 178. In the illustrated embodiment, the operating rod 184 is suitably affixed to the carrier or wheel 178 such that rotation of the rod 184 will likewise result in rotation of the carrier 178. Intermediate the ends thereof, the elongated operating rod 184 can be suitably supported for rotation by brackets or the like depending from the hopper 12. As shown in FIG. 3, one end of the elongated operating rod 184 extends to a location adjacent to the side 14/16 of the hopper 12 to allow for ready access thereto. In the illustrated embodiment, the accessible or free end of rod 184 is suitably configured to accommodate a tool (not shown) used to rotate the rod 182. As will be appreciated, rotation of the rod 184 will cause the carrier 178 to rotate, thus, causing the chain 180 to wind about the carrier 178, thus, raising the free end of the lever 104 to remove the stop 102 from the path of travel of the lever assembly 84. Of course, operation of the actuator 182 in reverse will permit the lever 104 to return to the position shown in FIG. 9, under the influence of spring mechanism 106, and thereby return the stop 102 into the path of travel of the levers 86, 86' so as to inhibit inadvertent shifting movement of the doors 40, 42 from their closed position toward an open position.

In that form shown in FIG. 9, each control apparatus 50 further includes an apparatus 190 for visually indicating, from at least one side of the car 10, the operable condition of lock assembly 100. Preferably, the indicator apparatus 190 includes an elongated indicator 192 which depends from and is movable with the lever 104 of lock assembly 100. As schematically shown in FIG. 9, a pair of longitudinally spaced indicator posts 194, 196 depend from railcar and, preferably, centersill 18, in proximity to the indicator 192.

Preferably, and as shown in FIG. 9, when lock assembly 100 is conditioned with stop 104 in operable engagement with lever assembly 84, the sight line of the free end of indicator 192 is arranged proximately midway and between indicator posts 194 and 196. When the lock assembly 100 is conditioned with stop 104 out of engagement with lever assembly 84 whereby permitting the doors 40, 42 to move from a closed position, and as shown schematically in FIG. 10, the sight line of the free end of indicator 192 is withdrawn or removed from between the indicator posts 194 and 196. It will be appreciated, of course, other devices for indicating the sight line relation of the indicator 192 relative to another location other than posts 194, 194, i.e., a specifically located painted area on lever 60 of linkage system 58, or the like, would equally suffice without detracting or departing from the spirit and scope of providing some visual reference for indicating the condition of the lock assembly 100 and which is readily viewable from a side of the car.

From the foregoing it will be readily appreciated and observed that numerous modifications and variations can be effected without departing from the true spirit and scope of the novel concept of the present invention disclosure. It will be appreciated that the present disclosure is intended to set forth an exemplification which is not intended to limit the invention disclosure to the specific embodiment illustrated. The disclosure is intended to cover by the appended claims all such modification and colorful variations as fall within the spirt and scope of the claims.

What is claimed is:

1. An apparatus for controlling discharge of material from a railcar having a longitudinally elongated centersill defining a longitudinal axis for said railcar, a hopper supported on said centersill, said hopper defining at least two discharge openings arranged in generally aligned relation relative to each other on opposite lateral sides of said axis and through which the material is gravitationally discharged from said hopper, with said railcar further including two laterally spaced doors mounted on said hopper and which are joined by an elongated connector, with each door being mounted toward an upper end thereof to said hopper for pivotal movement between closed and open positions relative to a discharge opening defined by said hopper whereby controlling discharge of the material from said hopper, said control apparatus comprising:

an operating shaft mountable on said railcar for rotation about a fixed axis extending transverse to said centersill, a linkage system operably connectable to said operating shaft and said elongated connector, and wherein said linkage system simultaneously moves said doors from their closed position in response to rotation of said operating shaft in a first direction and simultaneously returns said doors from their closed position in response to rotation of said shaft in a second direction, with said first and second directions being opposed to each other;

a mechanism operably connectable to said linkage system, said mechanism including a powered driver for selectively rotating said operating shaft so as to operate said linkage mechanism to either: simultaneously move said doors from their closed position; or, simultaneously return said doors to their closed position, and wherein the powered driver of said drive mechanism is operably connected to a lever radially extending from said operating shaft; and a lock assembly arranged in operable combination with said driver, said lock assembly including a displacable stop which, when the doors are in the closed position, positively engages with said lever to prevent movement of said doors from their closed position, and wherein when said doors are to be moved from their closed position, both manually and under the influence of powered movement of said driver, the stop of said lock assembly is released from engagement with said lever prior to pivotal movement of the doors from their closed position whereby allowing each door to be moved to the open position.

2. The apparatus according to claim 1, wherein said linkage system consists of two interconnected links including a first link connected toward one end to and movable with said operating shaft and a second link operably connected to said elongated connector.

3. The apparatus according to claim 2, wherein said first and second links of said linkage system are positioned in an overcenter arrangement when said doors are in their closed position, with said overcenter arrangement of said links serving as a lock to releasably hold said doors in their closed position while inhibiting said doors from inadvertently moving from their closed position.

4. The apparatus according to claim 1, wherein said displaceable stop of said lock assembly is resiliently biased into positive engagement with said lever.

5. The apparatus according to claim 1, wherein a drive is provided between said stop and the driver of said drive mechanism for positively displacing said stop from engagement with said lever upon actuation of said driver and prior to movement of the doors from their closed position.

6. The apparatus according to claim 5, wherein said drive includes a lost motion connection for permitting a predetermined range of movement of said driver prior to movement of said doors from their closed position.

7. The apparatus according to claim 6, further including a spring mechanism for positively returning said lost motion connection to an initial position upon return of said driver from an extended position such that said stop is permitted to again positively engage said lever upon the return of said doors to their closed position.

8. An apparatus for controlling discharge of material from a railcar having a longitudinally elongated centersill defining a longitudinal axis for said railcar, a hopper supported on said centersill, said hopper defining at least two discharge openings arranged in generally aligned relation relative to each other on opposite lateral sides of said axis and through which the material is gravitationally discharged from said hopper, with said railcar further including two laterally spaced doors mounted on said hopper in registry with said openings and which are joined by an elongated connector, with each door being mounted toward an upper end thereof to said hopper for pivotal movement between closed and open positions relative to a discharge opening defined by said hopper whereby controlling discharge of the material from said hopper, said control apparatus comprising:

an operating shaft mountable on said railcar for rotation about a fixed axis extending transverse to said centersill, with at least one end of said shaft being accessible to a side of said hopper after said shaft is mounted on the railcar so as to permit manual rotation of said operating shaft about said fixed axis;

a linkage system having first and second ends, with the first end of said linkage system being operably connectable to said operating shaft, and with said elongated connector being operably connectable toward a second end of said linkage system, and wherein said linkage system simultaneously moves said doors into their closed position in response to rotation of said operating shaft in a first direction and simultaneously moves said doors from their closed position in response to rotation of said shaft in a second direction, with said first and second directions being opposed to each other;

a lever radially extending from and movable with said operating shaft; and a lock assembly including a displacable stop which, when the doors are in the closed position, positively engages with said lever to prevent rotation of said operating shaft and thereby prevent movement of said doors from their closed position, said lock assembly further including a manually and automatically operated mechanism for removing said stop from engagement with said lever thereby allowing said doors to be moved from their closed position through manual rotation of said operating shaft.

9. The apparatus according to claim 8, wherein said manually operated mechanism for removing said stop from engagement with said lever is disposed remote from said lock assembly.

10. The apparatus according to claim 9, further including a drive mechanism including a selectively operated driver movable between retracted and extended positions, with said drive mechanism further including a drive connection between said selectively operated driver and an end of said lever radially disposed from the fixed axis of rotation of said operating shaft for either: simultaneously moving said doors into their closed position; or, simultaneously removing said doors from their closed position.

11. The apparatus according to claim 10, wherein the drive connection of said drive mechanism is further operably connected to the stop of said lock assembly.

12. The apparatus according to claim 10, wherein the drive connection of said drive includes a lost motion mechanism which, when said driver is operated to simultaneously open the doors from their closed position, allows timely removal of said stop from engagement with said lever during collapse of the lost motion mechanism thereby allowing for movement of said driver prior to movement of the doors from their closed position.

13. The apparatus according to claim 12, further including a spring mechanism for positively returning said lost motion mechanism to an initial position upon return of said driver from an extended position such that said stop is permitted to again positively engage said free ended lever upon the return of said doors to their closed position.

14. The apparatus according to claim 8, wherein said linkage system has two interconnected links including a first link, connected toward one end to and movable with said operating shaft, and a second link operably connected to said elongated connector.

15. The apparatus according to claim 14, wherein said first and second links of said linkage system are positioned in an overcenter arrangement when said doors are in their closed position, with said overcenter arrangement of said links serving as a lock to releasably hold said doors in their closed position while inhibiting said doors from inadvertently moving from their closed position.

16. The apparatus according to claim 8, wherein said displaceable stop of said lock assembly is resiliently biased into positive engagement with said lever.

17. An apparatus for controlling discharge of material from a railcar having a longitudinally elongated centersill defining a longitudinal axis for said railcar, a hopper supported on said centersill, said hopper defining at least two discharge openings arranged to opposite lateral sides of said axis and through which the material is gravitationally discharged from said hopper, with said railcar further including two laterally spaced doors mounted on said hopper and which are joined by an elongated connector, with each door being mounted for pivotal movement between closed and open positions relative to a discharge opening defined by said hopper whereby controlling discharge of the material from said hopper, said control apparatus comprising:
  an operating shaft mountable on said railcar for rotation about a fixed axis extending transverse to said centersill, said operating shaft having a lever radially extending therefrom;
  a linkage system operably disposed between said operating shaft and said elongated connector to simultaneously move said doors into their closed position in response to rotation of said operating shaft in a first direction and to simultaneously move said doors from their closed position in response to rotation of said shaft in a second direction, with said first and second directions being opposed to each other;
  a drive mechanism operably connectable to said linkage system, said drive mechanism including a driver for selectively operating said linkage mechanism to either: simultaneously move said doors into their closed position; or, simultaneously move said doors from their closed position; and
  a lock assembly arranged in operable combination with said driver and operable in either of two conditions, said lock assembly including a displacable stop which, when the doors are in their closed position, and in one operable condition, positively engages with said lever to prevent rotation of said operating shaft and thereby prevent movement of said doors from their closed position, and wherein said stop is driven out of engagement with said lever in timed relation to movement of said doors such that upon both manual and powered actuation of said driver to move said doors from their closed position, the lock assembly operated in a second operable condition wherein said stop is removed from engagement with said lever prior to movement of the doors from their closed position.

18. The apparatus according to claim 17, further including an apparatus for visually indicating from at least one side of said car the operable condition of said locking assembly.

19. An apparatus for controlling discharge of material from a railcar having a longitudinally elongated centersill defining a longitudinal axis for said railcar, a hopper supported on said centersill, said hopper having two sides and defines at least two discharge openings arranged in generally aligned relation relative to each other between the two sides of the hopper and through which the material is gravitationally discharged from said hopper, with said railcar further including two laterally spaced doors mounted on said hopper and which are joined by an elongated connector, with each door being mounted toward an upper end thereof to said hopper for pivotal movement between closed and open positions relative to a discharge opening defined by said hopper whereby controlling discharge of the material from said hopper, said control apparatus comprising:
  an operating shaft mountable on said railcar for rotation about a fixed axis extending transverse to said centersill,
  a linkage system operably connectable to said operating shaft and said elongated connector, and wherein said linkage system simultaneously moves said doors from their closed position in response to rotation of said operating shaft in a first direction and simultaneously returns said doors from their closed position in response to rotation of said shaft in a second direction, with said first and second directions being opposed to each other;
  a mechanism operably connectable to said linkage system, said mechanism including a powered driver for selectively rotating said operating shaft so as to operate said linkage mechanism to either: simultaneously move said doors from their closed position; or, simultaneously return said doors to their closed position, and wherein the powered driver of said drive mechanism is operably connected to a lever radially extending from said operating shaft;
  an electrical system for selectively operating the powered driver of said mechanism to move said doors between closed and open positions in response to power being provided to an electrical contact mounted on opposed sides of said hopper; and
  a lock assembly arranged in operable combination with said driver, said lock assembly including a displacable stop which, when the doors are in the closed position, positively engages with said lever to prevent movement of said doors from their closed position, and wherein when said doors are to be moved from their closed position, both manually and under the influence of powered movement of said driver, the stop of said lock assembly is released from engagement with said lever prior to pivotal movement of the doors from their closed position whereby allowing each door to be moved to the open position.

20. The apparatus according to claim 19, wherein said displaceable stop of said lock assembly is resiliently biased into positive engagement with said lever.

21. The apparatus according to claim 19, wherein a drive is provided between said stop and the driver of said drive mechanism for positively displacing said stop from engagement with said lever upon actuation of said driver and prior to movement of the doors from their closed position.

22. The apparatus according to claim 21, wherein said drive includes a lost motion connection for permitting a predetermined range of movement of said driver prior to movement of said doors from their closed position.

23. The apparatus according to claim 19 further including an apparatus for visually indicating from either side of said hopper the operable condition of said lock assembly.

24. An apparatus for controlling discharge of material from a railcar having a longitudinally elongated centersill defining a longitudinal axis for said railcar, a hopper supported on said centersill, said hopper having two sides with at least two discharge openings arranged in generally aligned relation relative to each other between the sides of said hopper and through which the material is gravitationally discharged from said hopper, with said railcar further including two laterally spaced doors mounted on said hopper in registry with said openings and which are joined by an elongated connector, with each door being mounted toward an upper end thereof to said hopper for pivotal movement between closed and open positions relative to a discharge opening defined by said hopper whereby controlling discharge of the material from said hopper, said control apparatus comprising:

an operating shaft mountable on said railcar for rotation about a fixed axis extending transverse to said centersill, with at least one end of said shaft being accessible to a side of said hopper after said shaft is mounted on the railcar so as to permit manual rotation of said operating shaft about said fixed axis;

a linkage system having first and second ends, with the first end of said linkage system being operably connectable to said operating shaft, and with said elongated connector being operably connectable toward a second end of said linkage system, and wherein said linkage system simultaneously moves said doors into their closed position in response to rotation of said operating shaft in a first direction and simultaneously moves said doors from their closed position in response to rotation of said shaft in a second direction, with said first and second directions being opposed to each other;

a lever radially extending from and movable with said operating shaft;

an electrical system for selectively moving said doors between closed and open positions in response to power being provided to an electrical contact mounted on opposed sides of said hopper; and a lock assembly including a displacable stop which, when the doors are in the closed position, positively engages with said lever to prevent rotation of said operating shaft and thereby prevent movement of said doors from their closed position, said lock assembly further including a manually and automatically operated mechanism for removing said stop from engagement with said lever thereby allowing said doors to be moved from their closed position through manual rotation of said operating shaft.

25. The apparatus according to claim 24, further including a drive mechanism including a selectively operated driver which is connected and responsive to said electrical system and is movable between retracted and extended positions, with said drive mechanism further including a drive connection between said selectively operated driver and an end of said lever radially disposed from the fixed axis of rotation of said operating shaft for either: simultaneously moving said doors into their closed position; or, simultaneously moving said doors from their closed position.

26. The apparatus according to claim 25, wherein the drive connection of said drive mechanism includes a lost motion mechanism which, when said driver is operated to simultaneously open the doors from their closed position, allows timely removal of said stop from engagement with said lever during collapse of the lost motion mechanism thereby allowing said driver to move prior to movement of the doors from their closed position.

27. The apparatus according to claim 24, further including an apparatus for visually indicating from either side of said hopper the operable condition of said lock assembly.

28. An apparatus for controlling discharge of material from a railcar having a longitudinally elongated centersill defining a longitudinal axis for said railcar, a hopper supported on said centersill, said hopper having two sides and defines at least two discharge openings arranged between said sides of said hopper and through which the material is gravitationally discharged from said hopper, with said railcar further including two laterally spaced doors mounted on said hopper and which are joined by an elongated connector, with each door being mounted for pivotal movement between closed and open positions relative to a discharge opening defined by said hopper whereby controlling discharge of the material from said hopper, said control apparatus comprising:

an operating shaft mountable on said railcar for rotation about a fixed axis extending transverse to said centersill, said operating shaft having a lever radially extending therefrom;

a linkage system operably disposed between said operating shaft and said elongated connector to simultaneously move said doors into their closed position in response to rotation of said operating shaft in a first direction and to simultaneously move said doors from their closed position in response to rotation of said shaft in a second direction, with said first and second directions being opposed to each other;

a drive mechanism operably connectable to said linkage system, said drive mechanism including a driver for selectively operating said linkage mechanism to either: simultaneously move said doors into their closed position; or, simultaneously move said doors from their closed position, and wherein said drive mechanism further includes a latch mounted on radially extending from said operating shaft and operably connected to said driver;

an electrical system for selectively operating the driver of said drive mechanism to move said doors between closed and open positions in response to power being provided to an electrical contact mounted on opposed sides of said hopper; and a lock assembly arranged in operable combination with said drive and operable in either of two conditions, said lock assembly including a displacable stop which, when the doors are in their closed position, and in one operable condition, positively engages with said lever to prevent rotation of said operating shaft and thereby prevent movement of said doors from their closed position, and wherein said stop is driven from engagement with said lever in timed relation to movement of said doors such that upon both manual and powered actuation of said driver of said drive mechanism to move said doors from their closed position, the lock assembly operates in a second operable condition wherein said stop is removed from engagement with said lever prior to movement of the doors from their closed position.

29. The apparatus according to claim 28, further including an apparatus for visually indicating from at least one side of said car the operable condition of said locking assembly.

* * * * *